(12) United States Patent
Calvert

(10) Patent No.: US 8,664,818 B2
(45) Date of Patent: Mar. 4, 2014

(54) ELECTRIC MOTOR OR GENERATOR WITH A LOW FRICTION TOUCH-DOWN AREA

(75) Inventor: Michael David Calvert, Dubai (AE)

(73) Assignee: Protean Electric Ltd. (GB)

( * ) Notice: Subject to any disclaimer, the term of this patent is extended or adjusted under 35 U.S.C. 154(b) by 0 days.

(21) Appl. No.: 13/501,454

(22) PCT Filed: Sep. 29, 2010

(86) PCT No.: PCT/IB2010/054388
§ 371 (c)(1),
(2), (4) Date: Jun. 19, 2012

(87) PCT Pub. No.: WO2011/045697
PCT Pub. Date: Apr. 21, 2011

(65) Prior Publication Data
US 2013/0069462 A1    Mar. 21, 2013

(30) Foreign Application Priority Data
Oct. 12, 2009  (GB) .................................. 0917759.3

(51) Int. Cl.
*H02K 5/12*    (2006.01)
*H02K 11/00*    (2006.01)
*H02K 5/16*    (2006.01)

(52) U.S. Cl.
USPC ................. 310/88; 310/67 R; 310/86; 310/90

(58) Field of Classification Search
USPC ....................... 310/87–90, 67 R, 86
See application file for complete search history.

(56) References Cited

U.S. PATENT DOCUMENTS

| | | | | |
|---|---|---|---|---|
| 2004/0222706 | A1* | 11/2004 | Ickinger | 310/12 |
| 2006/0091761 | A1* | 5/2006 | Lafontaine et al. | 310/261 |
| 2009/0039722 | A1* | 2/2009 | Cain et al. | 310/90 |
| 2009/0243301 | A1* | 10/2009 | Longtin et al. | 290/55 |

FOREIGN PATENT DOCUMENTS

| | | |
|---|---|---|
| DE | 19908450 A1 | 8/2000 |
| EP | 0221495 A1 | 5/1987 |
| EP | 1069669 A1 | 1/2001 |
| EP | 2106013 A2 | 9/2009 |
| GB | 926752 A | 5/1963 |

OTHER PUBLICATIONS

Intellectual Property Office, UK Office Action, Dec. 4, 2009.

* cited by examiner

*Primary Examiner* — Tran Nguyen
*Assistant Examiner* — Jose Gonzalez Quinones
(74) *Attorney, Agent, or Firm* — The Mason Group Patent Specialists LLC; Valerie M. Davis

(57) ABSTRACT

An electric motor or generator having a stator with stator teeth for mounting electrical coils and a rotor, wherein the stator has a first surface that is parallel to an axis of rotation of the rotor and is axially separated from the stator teeth and the rotor has a second surface that is formed in substantially the same axial position as the stator s first surface, wherein material is mounted on the first surface or the second surface that has a lower frictional coefficient than the first surface or second surface.

14 Claims, 5 Drawing Sheets

ELECTRIC MOTOR OR GENERATOR WITH A LOW FRICTION TOUCH-DOWN AREA

The present invention relates to an electric motor or generator, in particular an electric motor or generator having a low friction touch-down pad.

Electric motors work on the principle that a current carrying wire will experience a force when in the presence of a magnetic field. When the current carrying wire is placed perpendicular to the magnetic field the force on the current carrying wire is proportional to the flux density of the magnetic field. Typically, in an electric motor the force on a current carrying wire is formed as a rotational torque.

Examples of known types of electric motor include the induction motor, brushless permanent magnet motor, switched reluctance motor and synchronous slip ring motor, which have a rotor and a stator, as is well known to a person skilled in the art.

To minimise the risk that the flux density between the stator and rotor will be significantly reduced, the gap between the stator and rotor is kept relatively small. However, as a result of the air gap between the rotor and stator being minimised, during operation the rotor of an electric motor can occasionally hit the stator. This is typically as a result of the rotor being distorted or deformed by the torque being applied to the rotor and/or due to thermal expansion of the stator and/or the rotor and/or by shock loading on the electric motor.

If contact between the rotor and stator does occur this will increase friction between the stator and rotor, thereby decreasing the efficiency of the motor. Further, for electric motors that have a rotor with permanent magnets, such as a synchronous permanent magnet electric motor, contact between the stator and the permanent magnets can result in the permanent magnets being damaged or destroyed, thereby reducing magnetic flux and consequently motor torque.

Additionally, contact between the stator and rotor can grind down outer sections of the stator causing shorting to occur between stator laminations, which can have a detrimental effect on eddy current flow in the stator.

It is desirable to improve this situation.

In accordance with an aspect of the present invention there is provided an electric motor or generator according to the accompanying claims.

By using a portion of the stator or rotor as a low friction touch-down area, this has the advantage of minimising frictional forces, during use, between the stator and rotor of an electric motor.

Additionally, by designing into the electric motor a low friction touch-down portion that is designed to be the first point of contact between the stator and rotor this minimises the risk of damage to other parts of the stator and rotor, for example damage to permanent magnets and/or stator laminations.

The present invention will now be described, by way of example, with reference to the accompanying drawings, in which.

Figure 1:
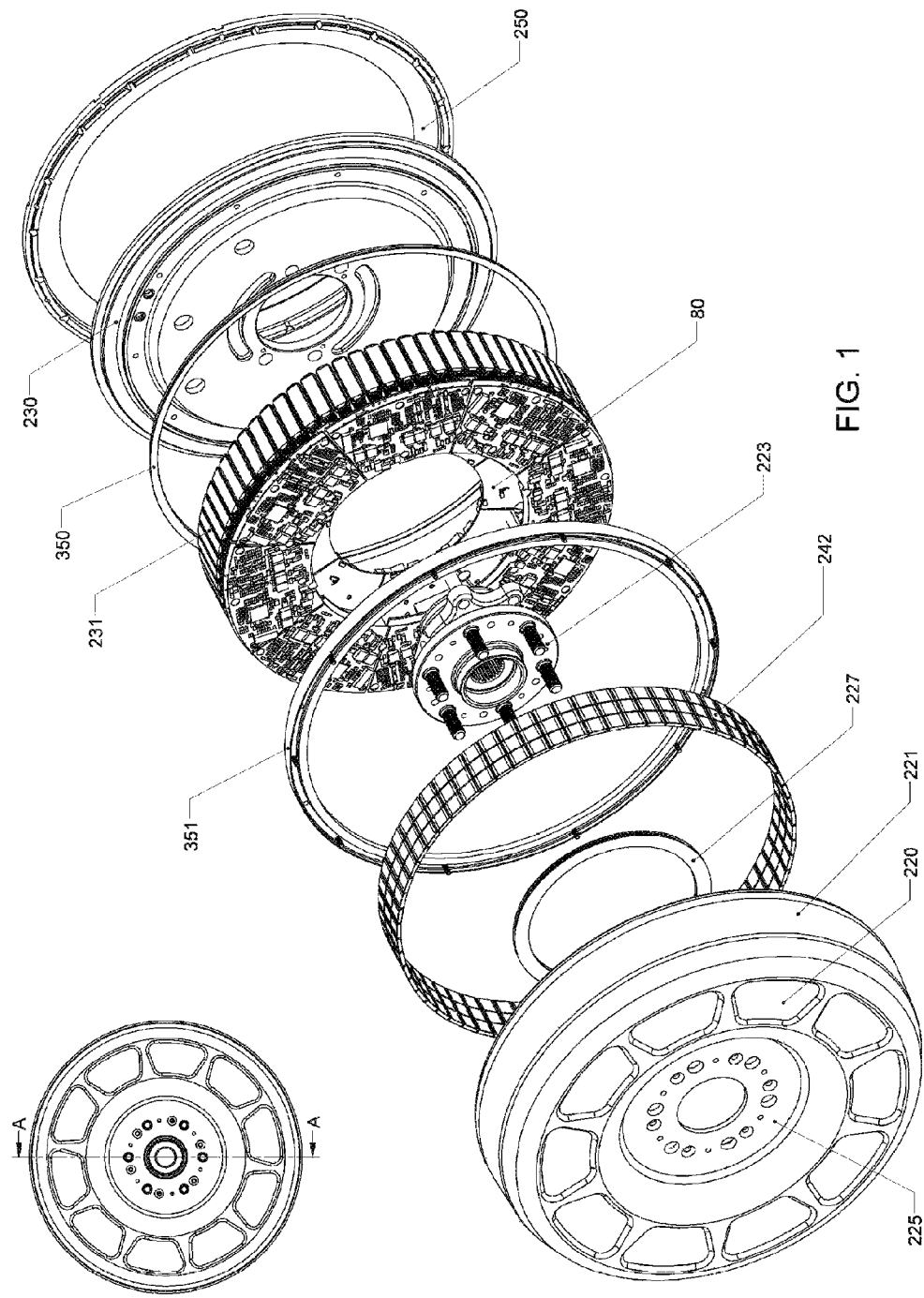
FIG. 1 illustrates an exploded view of a motor embodying the present invention.

FIG. 1 illustrates an electric motor assembly incorporating an electric motor having a low friction touch-down pad according to the present invention where the electric motor assembly includes built in electronics and is configured for use as a hub motor or in-wheel electric motor built to accommodate a wheel. However, the present invention could be incorporated in any form of electric motor. The electric motor can also be configured as a generator.

Referring to FIG. 1, the electric motor assembly includes a stator comprising a rear portion 230 (i.e. rear stator wall) forming a first part of the stator, and a heat sink and drive arrangement 231 comprising multiple coils and electronics to drive the coils as well as a heat sink. The coil drive arrangement 231 is fixed to the rear portion 230 to form the stator which may then be fixed to a vehicle and does not rotate during use. The coils themselves are formed on tooth laminations which together with the drive arrangement 231 and rear portion 230 form the stator.

A rotor includes a rotor housing and touch-down ring 250. The rotor housing includes a front portion 220 and a cylindrical portion 221 forming a cover, which substantially surrounds the stator. The rotor housing includes a plurality of magnets 242 arranged around the inside of the cylindrical portion 221 on a rotor back iron. The magnets are thus in close proximity to the coils on the assembly 231 so that magnetic fields generated by the coils in the assembly 231 generate a force on the magnets 242 arranged around the inside of the cylindrical portion 221 of the rotor housing thereby causing the rotor housing to rotate. A rotor clamping ring 351 is mounted to the cylindrical portion 221. The rotor clamping ring 351 is arranged to retain the rotor back iron within the cylindrical portion 221. The rotor clamping ring 351 also acts as a sealing surface for a V shaped seal 350, which is mounted to the rear stator wall 230. The touch-down ring 250 is mounted to the rotor housing via the rotor clamping ring 351 once the rotor housing has been attached to the stator.

The rotor housing is attached to the stator by a bearing block 223. The bearing block 223 can be a standard bearing block as would be used in a vehicle to which the motor assembly is to be fitted. The bearing block 223 comprises two parts, a first part fixed to the stator and a second part fixed to the rotor. The bearing block 223 is fixed to a central portion 233 of the wall 230 of the stator and also to a central portion 225 of the housing wall 220 of the rotor housing. The rotor housing is thus rotationally fixed to the vehicle with which it is to be used via the bearing block 223 at the central portion 225 of the rotor housing.

This has an advantage in that a wheel rim and tyre can then be fixed to the rotor housing at the central portion 225 using the normal wheel bolts to fix the wheel rim to the central portion of the rotor and consequently firmly onto the rotatable side of the bearing block 223. The wheel bolts may be fitted through the central portion 225 of the rotor housing through into the bearing block itself. A first advantage of this arrangement is that the whole assembly may be simply retrofitted to an existing vehicle by removing the wheel, bearing block and any other components such as the braking arrangement. The existing bearing block can then be fitted inside the assembly and the whole arrangement fitted to the vehicle on the stator side and the normal rim and wheel fitted to the rotor housing so that the rim and wheel surrounds the whole motor assembly. Accordingly, retrofitting to existing vehicles becomes very simple.

A further advantage is that there are no forces for supporting the vehicle on the outside of the rotor housing, particularly on the circumferential wall 221 carrying the magnets on the inside circumference. This is because the forces for carrying the vehicle are transmitted directly from the suspension fixed to one side of the bearing block (via the central portion of the stator wall) to the central portion of the wheel surrounding the rotor housing fixed to the other side of the bearing block (via the central portion of the rotor wall). No complicated bearing arrangement is needed to maintain alignment of the circumferential rotor wall.

Figure 3:
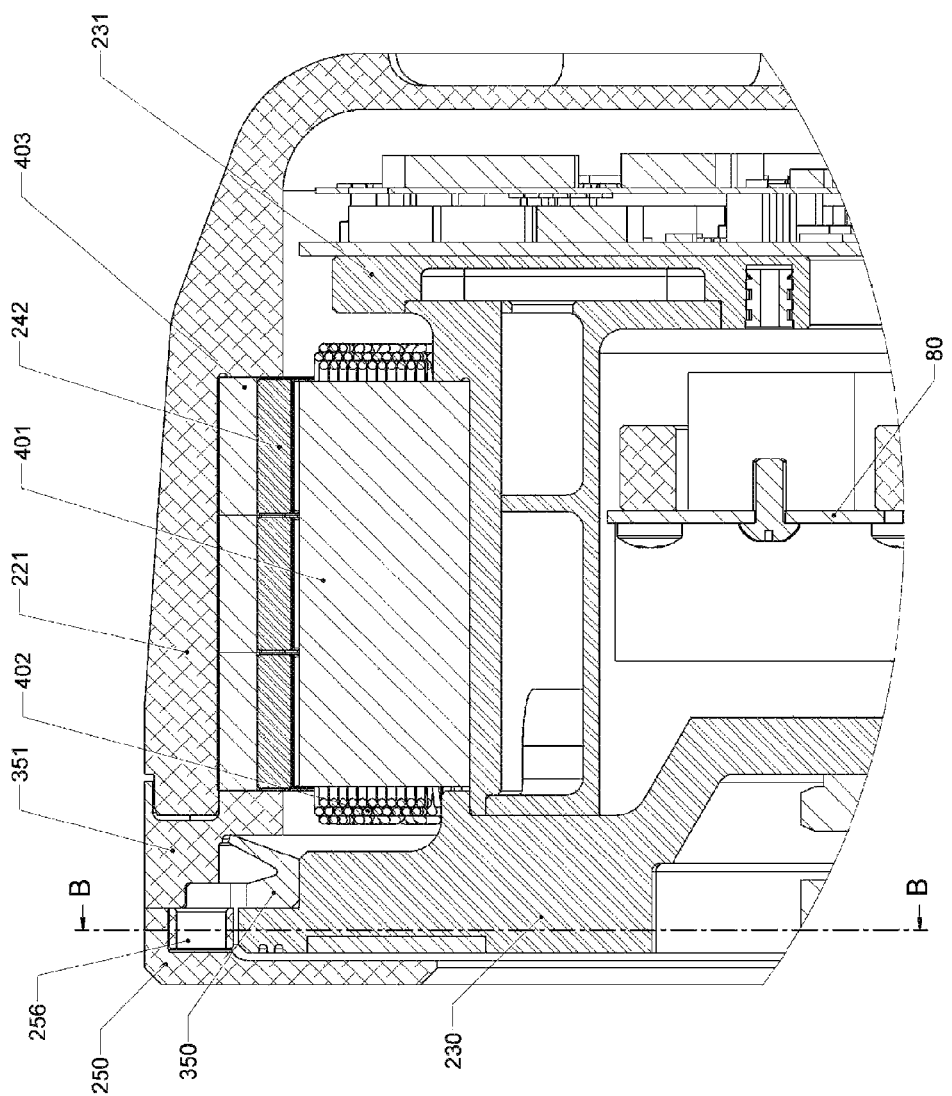
FIG. 3 illustrates a partial cross sectional view of the motor shown in FIG. 1 along the view A-A.

Once the rotor housing and stator have been attached via the bearing block 223 the touch-down ring 250 is mounted to the rotor housing. Preferably, the touch-down ring 250 has a lip that extends radially down the side of the stator when the touch-down ring is mounted to the rotor housing, thereby enclosing the stator within the rotor, as shown in FIG. 3. A gap exists between the inner surface of the touch-down ring lip and the outer surface of the rear stator wall 230. The width of the gap is selected so that the inner surface of the touch-down ring lip and the outer surface of the rear stator wall 230 acts as a labyrinth seal to prevent large contaminants entering through the labyrinth seal into the motor assembly. Accordingly, the touch-down ring 250 helps to minimize the ingress of dirt into the electric motor.

The rotor housing also includes a focusing ring and magnets 227 for position sensing.

Figure 2:
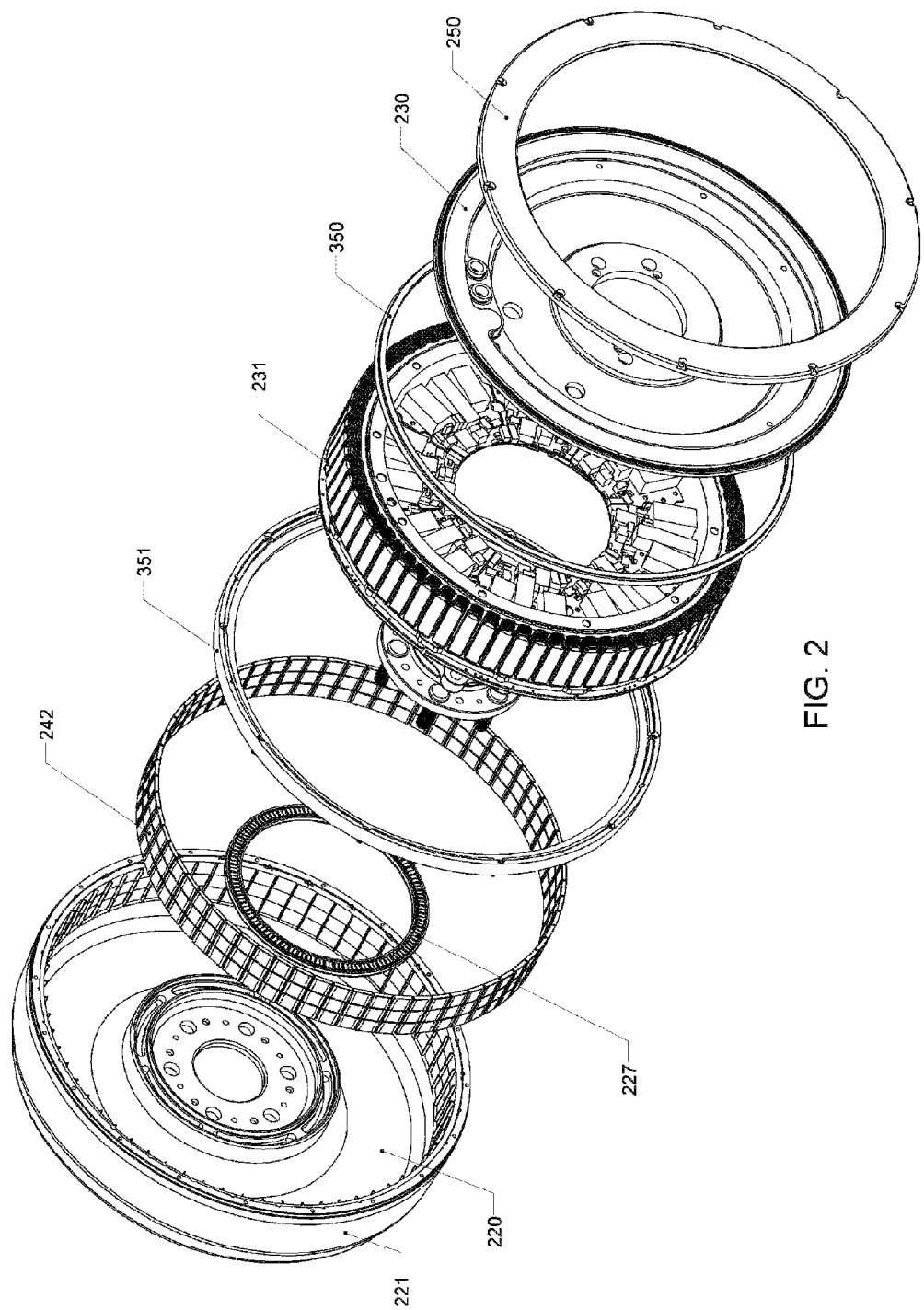
FIG. 2 is an exploded view of the motor of FIG. 1 from an alternative angle.

FIG. 2 shows an exploded view of the same assembly as FIG. 1 from the opposite side showing the stator comprising the rear stator wall 230 and coil and electronics assembly 231. The rotor housing comprises the outer rotor wall 220 and circumferential wall 221 within which magnets 242 are circumferentially arranged. As previously described, the stator is connected to the rotor housing via the bearing block 223 at the central portions of the rotor and stator walls with the touch-down ring being attached to the rotor housing once the rotor housing and stator have been attached.

As described above, a V shaped seal 350 is provided between the circumferential wall 221 of the rotor and the outer edge of the stator housing 230. The magnetic ring 227 comprising a commutation focusing ring and a plurality of magnets are provided for the purpose of indicating the position of the rotor with respect to the stator to a series of sensors arranged on the control devices 80 of the stator.

FIG. 3 illustrates a cross sectional view of a portion of the electric motor along the line A-A of FIG. 1.

As described above, the rear-portion 230 is coupled to the heat sink and drive arrangement 231. The heat sink and drive arrangement 231 which includes tooth laminations 401 (i.e. interspersed around the stator are teeth that, to minimise eddy currents, are formed from laminations). Conductive wire 402 (e.g. copper wire) is coiled around the tooth laminations 401. Magnets 242 are mounted to the cylindrical portion 221 via a rotor back iron 403.

To ensure that the rotor can rotate around the stator without interference from the stator an air gap exists between the top surface of the laminated stator tooth 401 and the bottom surface of the magnets 242. A typical air gap would be in the region of 1.0 mm.

The rotor clamping ring 351 is mounted to the cylindrical portion 221, thereby clamping the rotor back iron 403 and magnets 242 within the cylindrical portion 221 of the rotor housing.

The V shaped seal 350, which is mounted to the rear stator wall 230, abuts an inner surface of the rotor clamping ring 351. The V shaped seal 350 is arranged to create a seal between that stator and rotor, thereby preventing dirt and other unwanted material entering between the stator and rotor from outside the electric motor. A typical material used for the V shaped seal 350 would be Nitrile rubber, however any suitable material may be used.

The touch-down ring 250 is mounted to the rotor clamping ring 351. The outer circumferential portion of the touch-down ring 250 has substantially the same diameter as the outer diameter of the cylindrical portion 221, thereby when the touch-down ring 250 is mounted to the rotor clamping ring 351 this has the effect of extending the axial length of the outer section of the cylindrical portion 221 and the clamping ring 351. The touch-down ring 250 has a lip portion that extends in a radial direction over a portion of the rear-portion 230, thereby covering the radial air gap between the rear-portion 230 and the touch-down ring 250, as described above. The lip portion of the touch-down ring 250 acts as a labyrinth seal.

Typically, to reduce weight while retain structural strength the rotor housing and the touch-down ring 250 are made from an aluminium alloy. Similarly, stator heat sink is also made from an aluminium alloy.

Formed on a circumferential portion of the rear portion 230 is a first surface that extends in an axial direction that is radially separated from a second surface circumferentially formed on the touch-down ring 250. Preferably, the first surface forms a ring around the circumference of the rear-portion 230 of the stator. Preferably, the second surface forms a ring around the inner circumference of the rotor if the rotor is mounted around the stator or an outer circumference of the rotor if the stator is mounted around the rotor.

The first surface is axially separated from the tooth laminations and preferably is formed on a shoulder portion of the rear portion 230.

The first surface of the rear portion 230 and the second surface of the touch-down ring 250 act as a touch down area that is arranged to act as a contact point between the stator and rotor if the rotor becomes distorted or deformed during use, thereby avoiding the risk of damage to the tooth laminations and/or the magnets 242.

As typically the first point of contact between the stator and the rotor will be the furthest point from the front portion 220 of the rotor, preferably the first surface will be formed on a shoulder portion of the rear portion 230 furthest from the front portion 220.

The radial gap between the first surface and the second surface is arranged to be smaller than the gap between the top surface of the laminated stator tooth 401 and the bottom surface of the magnets 242. For example, the gap between the first surface and the second surface may be selected to be half the gap between the top surface of the laminated stator tooth 401 and the bottom surface of the magnet 242 (e.g. if the gap between the top surface of the laminated stator tooth and the bottom surface of the magnets is approximately 1.0 mm the gap between the first surface and the second surface will be approximately 0.5 mm). However, any gap distance between the first surface and the second surface may be selected that is likely to result in contact between the first surface and the second surface before contact between the top surface of the laminated stator tooth and the bottom surface of the magnets occurs.

If a touch down incident between the first surface and the second surface should occur, to minimise friction between the stator and the rotor a low friction material, for example nylon or a plastic such as PTFE, Apticote, Teflon, or diamond like carbon DLL, is applied to the first surface and/or the second surface.

Figure 4:
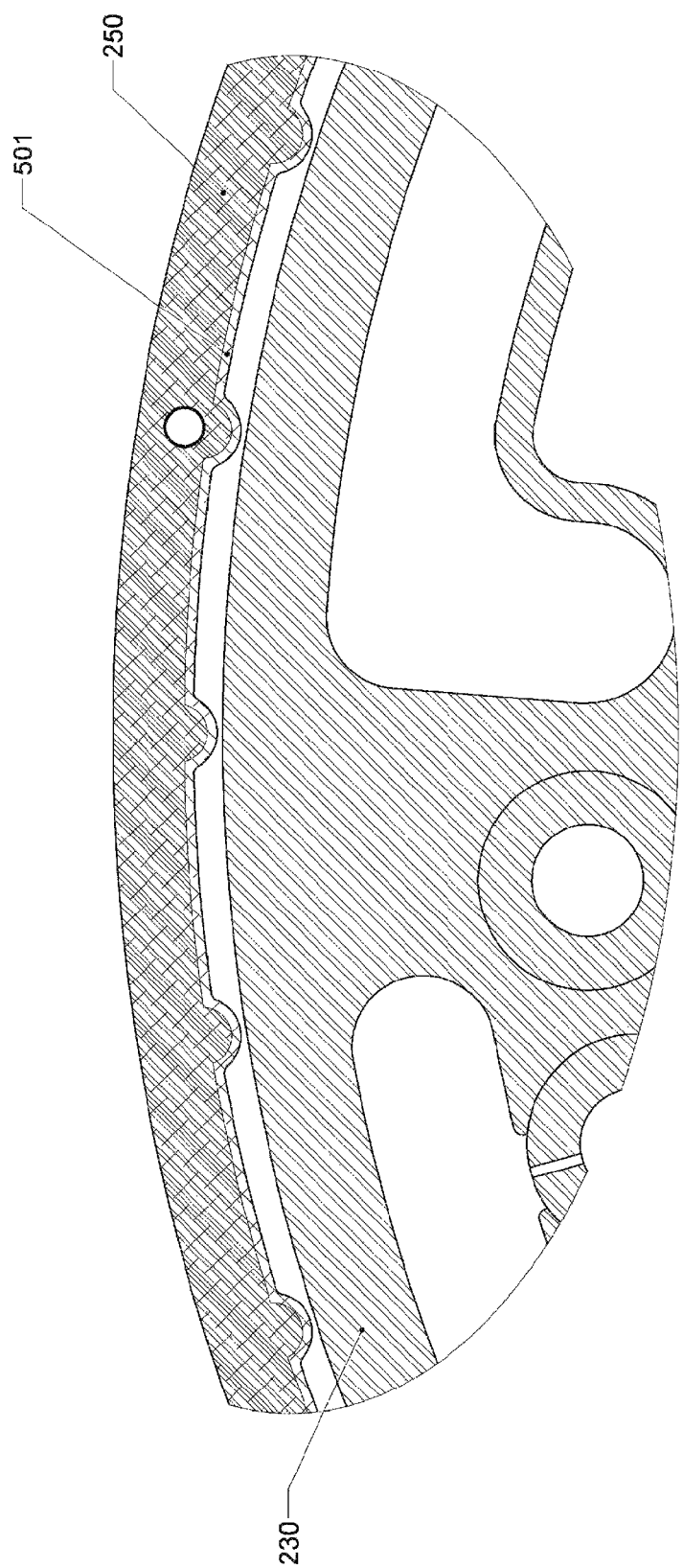
FIG. 4 illustrates a partial cross sectional view of the motor having a touch down ring.

In a first embodiment, as shown in FIG. 4, material is machined away from the second surface and then coated with the low friction material 501 (i.e. material having a lower frictional coefficient than the first surface material and/or the second surface material). However, in an alternative embodiments material can be machined from the first surface in addition or in the alternative to the second surface and then coated with low friction material. Should a touch down incident occur the first surface and second surface will skid or slide with respect to each other, thereby keeping the frictional forces between the stator and rotor to a minimum.

Figure 5:
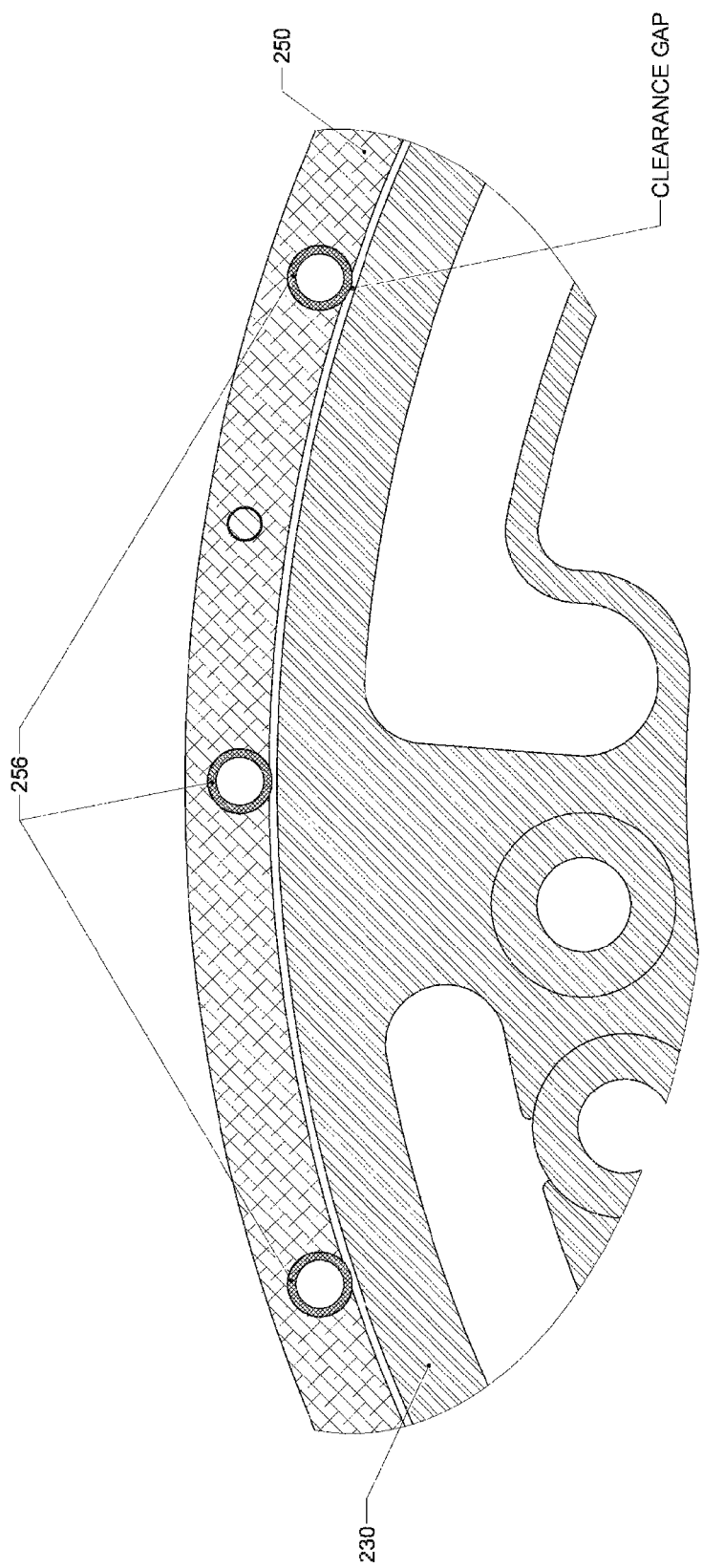
FIG. 5 illustrates a partial cross sectional view of the motor shown in FIG. 3 along the line B-B having an alternative embodiment of a touch down ring.

In a second embodiment, as shown in FIG. 5, one or more recesses are machined into the second surface and a low-friction bearing 256, for example a low-friction polymer bearing, is inserted into each of the recesses. However, in an alternative embodiments one or more recesses can be machined from the first surface in addition or in the alternative to the second surface and a low friction bearing is inserted into each of the recesses. A part of the bearing's surface extends from the first surface and/or second surface so that upon a touch down incident occurring the bearing surface that extends from the first surface and/or the second surface will contact the opposite surface, thereby allowing the first surface and second surface to skid or slid with respect to each other. FIG. 5 illustrates a cross section view along the line B-B in FIG. 1, where twenty low friction bearings have been placed in recesses formed in the second surface of the touch-down ring 250. Although FIG. 5 illustrates the use of twenty low friction bearings, any number of friction bearings may be used.

In an alternative embodiment (not shown), the touch-down ring 250 and/or the section of the stator radially opposite the touch-down ring 250 is arranged to be made of a low friction material having a lower frictional coefficient than that between the stator teeth and the rotor magnets.

The invention claimed is:

1. An electric motor or generator comprising:
   a stator with stator teeth for mounting electrical coils;
   a rotor;
   a touch-down ring mounted to the rotor; and
   a low friction material coupled to a surface of at least one of the stator or the touch-down ring;
   wherein the stator has a first surface that is parallel to an axis of rotation of the rotor and is axially separated from the stator teeth and the touch-down ring has a second surface that is formed in substantially the same axial position as the stator's first surface, wherein the low friction material is coupled to at least one of the first surface of the stator or the second surface of the touch-down ring, and the low friction material has a lower frictional coefficient than the first surface or second surface, wherein the touch-down ring includes a radial lip that is axially separated from a radial wall of the stator that is arranged to form a labyrinth seal between the rotor and stator.

2. An electric motor or generator according to claim 1, wherein the low friction material is a low friction plastics.

3. An electric motor or generator according to claim 1, wherein the distance between the first surface and the second surface is less than the distance between the closest point on the stator teeth and the rotor.

4. An electric motor or generator according to claim 3, wherein the distance between the first surface and the second surface is substantially half the distance between the closest point on the stator teeth and the rotor.

5. An electric motor or generator according to claim 1, wherein the rotor has permanent magnets mounted on a surface of the rotor opposite the stator teeth.

6. An electric motor or generator according to claim 1, wherein the first surface is located on an edge portion of the stator.

7. An electric motor or generator according to claim 1, further comprising a seal located between the stator and rotor.

8. An electric motor or generator according to claim 1, wherein the first surface forms a ring around the circumference of the stator opposite the touch-down ring.

9. An electric motor or generator according to claim 1, wherein the second surface forms a ring around the circumference of the touch-down ring opposite the stator.

10. An electric motor or generator according to claim 1, wherein the first surface forms a recess on the stator for allowing a low friction bearing to be mounted in the recess.

11. An electric motor or generator according to claim 10, wherein a plurality of recesses are formed on the circumference of the stator for mounting the low friction bearings.

12. An electric motor or generator according to claim 1, wherein the second surface forms a recess on the rotor for allowing a low friction bearing to be mounted in the recess.

13. An electric motor or generator according to claim 12, wherein a plurality of recesses are formed on the circumference of the stator for mounting the low friction bearings.

14. An electric motor or generator according to claim 1, wherein the touch-down ring is mounted to a rotor housing.

\* \* \* \* \*